(12) United States Patent
Meyer

(10) Patent No.: US 11,577,629 B2
(45) Date of Patent: Feb. 14, 2023

(54) VEHICLE SEAT MANAGEMENT SYSTEM

(71) Applicant: Innovative Biomechanical Solutions, LLC, Indianapolis, IN (US)

(72) Inventor: Daniel Christopher Meyer, Plainfield, IN (US)

(73) Assignee: Innovative Biomechanical Solutions, LLC, Indianapolis, IN (US)

( * ) Notice: Subject to any disclaimer, the term of this patent is extended or adjusted under 35 U.S.C. 154(b) by 43 days.

(21) Appl. No.: 17/091,305

(22) Filed: Nov. 6, 2020

(65) Prior Publication Data

US 2022/0144139 A1 May 12, 2022

(51) Int. Cl.
*B60N 2/02* (2006.01)
*B60N 2/90* (2018.01)

(52) U.S. Cl.
CPC ........... *B60N 2/0244* (2013.01); *B60N 2/919* (2018.02); *B60N 2002/0268* (2013.01); *B60N 2002/0272* (2013.01); *B60N 2002/924* (2018.02)

(58) Field of Classification Search
CPC ............... B60N 2002/0268; B60N 2002/0272
See application file for complete search history.

(56) References Cited

U.S. PATENT DOCUMENTS

| | | | |
|---|---|---|---|
| 4,722,550 A | 2/1988 | Imaoka et al. | |
| 4,728,873 A | 3/1988 | Inou et al. | |
| 4,840,425 A | 6/1989 | Noble | |
| 4,853,687 A | 8/1989 | Isomura et al. | |
| 4,888,535 A | 12/1989 | Brusasco | |
| 5,005,904 A | 4/1991 | Clemens et al. | |
| 5,097,185 A | 3/1992 | Ogasawara | |
| 5,127,708 A | 7/1992 | Kishi et al. | |
| 5,129,704 A | 7/1992 | Kishi et al. | |
| 5,155,685 A | 10/1992 | Kishi et al. | |
| 5,243,267 A | 9/1993 | Ogasawara | |
| 5,263,765 A | 11/1993 | Nagashima et al. | |
| 5,285,139 A | 2/1994 | Ogasawara | |
| 5,319,248 A | 6/1994 | Endou | |
| 5,320,409 A | 6/1994 | Katoh et al. | |
| 5,321,617 A | 6/1994 | Mori et al. | |
| 5,411,468 A | 5/1995 | Chen | |
| 5,455,494 A | 10/1995 | Ogasawara | |
| 5,490,713 A | 2/1996 | Fukuoka | |

(Continued)

FOREIGN PATENT DOCUMENTS

| | | | |
|---|---|---|---|
| JP | 2005-119559 A | 5/2005 | |
| JP | 2016-037107 A | 3/2016 | |

(Continued)

OTHER PUBLICATIONS

"2009 BMW X5 Sports Activity Vehicle" BMW, p. 58.

(Continued)

*Primary Examiner* — Timothy J Brindley
(74) *Attorney, Agent, or Firm* — Woodard Emhardt Henry Reeves & Wagner LLP

(57) ABSTRACT

A vehicle seat management system configured to adjust one or more seats based on occupant and/or vehicular data. In one aspect, the occupant and/or vehicular data may be sent to a remote device for calculation of a seat adjustment algorithm. In another aspect, the seat adjustment algorithm may be sent via wireless transmission. In one example, the wireless transmission may be 5G.

25 Claims, 12 Drawing Sheets

(56) References Cited

U.S. PATENT DOCUMENTS

| | | | |
|---|---|---|---|
| 5,497,326 A | 3/1996 | Berland et al. |
| 5,498,061 A | 3/1996 | Fukuoka |
| 5,507,557 A | 4/1996 | Fukuoka |
| 5,516,192 A | 5/1996 | Fukuoka |
| 5,523,664 A | 6/1996 | Ogasawara et al. |
| 5,542,741 A | 6/1996 | Fukuoka |
| 5,533,784 A | 7/1996 | Fukuoka |
| 5,556,161 A | 9/1996 | Fukuoka |
| 5,637,076 A | 6/1997 | Hazard et al. |
| 5,647,633 A | 7/1997 | Fukuoka |
| 5,812,399 A | 9/1998 | Judic et al. |
| 5,816,653 A | 10/1998 | Benson |
| 5,860,699 A | 1/1999 | Weeks |
| 5,894,207 A | 4/1999 | Goings |
| 5,903,122 A | 5/1999 | Mesnage et al. |
| 5,930,152 A | 7/1999 | Dumont et al. |
| 5,934,748 A | 8/1999 | Faust et al. |
| 6,007,151 A | 12/1999 | Benson |
| 6,033,021 A | 3/2000 | Udo et al. |
| 6,049,748 A | 4/2000 | Newman et al. |
| 6,053,880 A | 4/2000 | Sleichter, III |
| 6,055,473 A | 4/2000 | Zwolinski et al. |
| 6,129,419 A | 10/2000 | Neale |
| 6,497,454 B1 | 12/2002 | Davidsson |
| 6,590,354 B2 | 7/2003 | Hein |
| 6,592,533 B1 | 7/2003 | Yonekawa et al. |
| 6,677,720 B2 | 1/2004 | Fraser |
| 6,682,494 B1 | 1/2004 | Sleichter, III et al. |
| 6,814,410 B2 | 11/2004 | Piaulet et al. |
| 6,820,895 B2 | 11/2004 | Levine |
| 7,113,100 B2 | 9/2006 | Yoshinori et al. |
| 7,145,263 B2 | 12/2006 | Nathan et al. |
| 7,152,920 B2 | 12/2006 | Sugiyama et al. |
| 7,172,247 B2 | 2/2007 | Beloch et al. |
| 7,239,096 B2 | 7/2007 | Hancock et al. |
| 7,322,651 B2 | 1/2008 | Makhsous et al. |
| 7,422,285 B2 | 9/2008 | Phipps |
| 7,532,964 B2 | 5/2009 | Fujita et al. |
| 7,566,096 B2 | 7/2009 | Phipps |
| 7,585,024 B2 | 9/2009 | Rogers |
| 8,042,868 B2 | 10/2011 | Sakai et al. |
| 8,126,616 B2 | 2/2012 | Phipps et al. |
| 8,710,784 B2 | 4/2014 | Meyer et al. |
| 9,187,020 B2 | 11/2015 | Meyer |
| 2002/0070591 A1 | 6/2002 | Nivet |
| 2002/0074785 A1 | 6/2002 | Levine |
| 2002/0185985 A1 | 12/2002 | Fraser |
| 2002/0190549 A1 | 12/2002 | Chien-Chuan |
| 2003/0075959 A1 | 4/2003 | Xue et al. |
| 2004/0122574 A1 | 6/2004 | Inman et al. |
| 2005/0127728 A1 | 6/2005 | Sugiyama |
| 2007/0241595 A1 | 10/2007 | Nathan et al. |
| 2008/0091322 A1 | 4/2008 | Phipps |
| 2009/0005938 A1 | 1/2009 | Phipps |
| 2012/0086249 A1 | 4/2012 | Hotary et al. |
| 2014/0217792 A1 | 8/2014 | Meyer et al. |
| 2017/0327124 A1* | 11/2017 | Kim ................ B60W 50/14 |
| 2017/0349061 A1 | 12/2017 | Benson et al. |
| 2018/0178690 A1* | 6/2018 | Castillo ............... B60N 2/0244 |
| 2018/0186251 A1 | 7/2018 | Yetukuri et al. |
| 2018/0208080 A1* | 7/2018 | Hirayama ............ B60N 2/0224 |
| 2018/0222350 A1* | 8/2018 | Hirayama ............. B60N 2/995 |
| 2018/0297488 A1 | 10/2018 | Lem et al. |
| 2019/0366878 A1* | 12/2019 | Dhaini ................ B60N 2/0244 |
| 2021/0016686 A1* | 1/2021 | Yetukuri ............. B60N 2/0244 |
| 2021/0309124 A1* | 10/2021 | Fields ................. B60W 30/095 |

FOREIGN PATENT DOCUMENTS

| | | |
|---|---|---|
| KR | 10-1409124 B1 | 6/2014 |
| KR | 10-2135261 B1 | 7/2020 |
| WO | WO 2007/041099 A | 4/2007 |

OTHER PUBLICATIONS

"2010 Ford Taurus: More Hot, Less Bull", http://jalopnik.com/5116508/2010-ford-taurus-more-hot-less-bull, last accessed Jan. 13, 2009.

"How Stuff Works 1990-1999 Cadillac" http://auto.howstuffworks.com/1990-1999-cadillac9.htm, last accessed Jan. 27, 2009.

European Search Report for EP 08253931.3-2424 dated Jul. 8, 2009.

International Search Report for PCT/US06/37475, dated Jul. 15, 2007.

International Search Report, International Application No. PCT/US08/51583, dated Jul. 1, 2008.

Written Opinion for PCT/US06/37475, dated Jul. 16, 2007.

Written Opinion of the International Searching Authority, International Application No. PCT/US08/51563, dated Jul. 1, 2008, 5 pages.

English translation of JP 2005-119559 A (machine translation obtained from Google Patents—patents.google.com on May 12, 2022).

English translation of JP 2016-037107 A (machine translation obtained from Google Patents—patents.google.com on May 12, 2022).

English translation of KR 10-1409124 B1 (machine translation obtained from Google Patents—patents.google.com on May 12, 2022).

English translation of KR 10-2135261 B1 (machine translation obtained from Google Patents—patents.google.com on May 12, 2022).

Search Report and Written Opinion in International Application No. PCT/US2021/057812, dated Feb. 18, 2022, 9 pages.

* cited by examiner

VEHICLE SEAT MANAGEMENT SYSTEM

BACKGROUND

Vehicle passengers and drivers are often fatigued and uncomfortable on road trips. This is especially true for individuals who spend a large portion of their working day sitting in a vehicle seat and/or individuals on long road trips. As should be appreciated, driver fatigue is a condition that may lead to impairment of the motor skills and an increased potential for a vehicular collision. Similarly, passengers and drivers alike are at risk for long-term health conditions as a result of sitting in uncomfortable seating position for extended periods.

Currently, vehicle anti-fatigue seating systems are generally pre-set from the factory. In some cases, these pre-set factory movement algorithms are unable to provide comfort and anti-fatigue properties to all users in a variety of applications. For example, the same seat movement algorithm may not be as effective for a large adult as it would be for a small teen. Similarly, vehicle data such as location, road conditions, and/or speed may not be taken into account. In many applications, it would be advantageous to have a seat adjustment algorithm that was personalized and calculated based on a variety of passenger and/or vehicular data.

Thus, there is a need for improvement in this field.

SUMMARY

Disclosed is a vehicle seat management system for providing a passenger with anti-fatigue capabilities. In one aspect, the vehicle seat management system includes one or more seat adjustment inputs. In one example, the one or more seat adjustment inputs may be a seat adjustment algorithm. In another aspect, the one or more seat adjustment inputs are created from a combination of passenger and/or vehicle data. In yet another aspect, the one or more seat adjustment inputs are stored on a remote device and transferred to controller via wireless transmission. In one example, the controller may be a vehicle's seat electronic control unit (ECU).

Further forms, objects, features, aspects, benefits, advantages, and embodiments of the present disclosure will become apparent from a detailed description and drawings provided herewith.

DESCRIPTION OF THE SELECTED EMBODIMENTS

Figure 1:
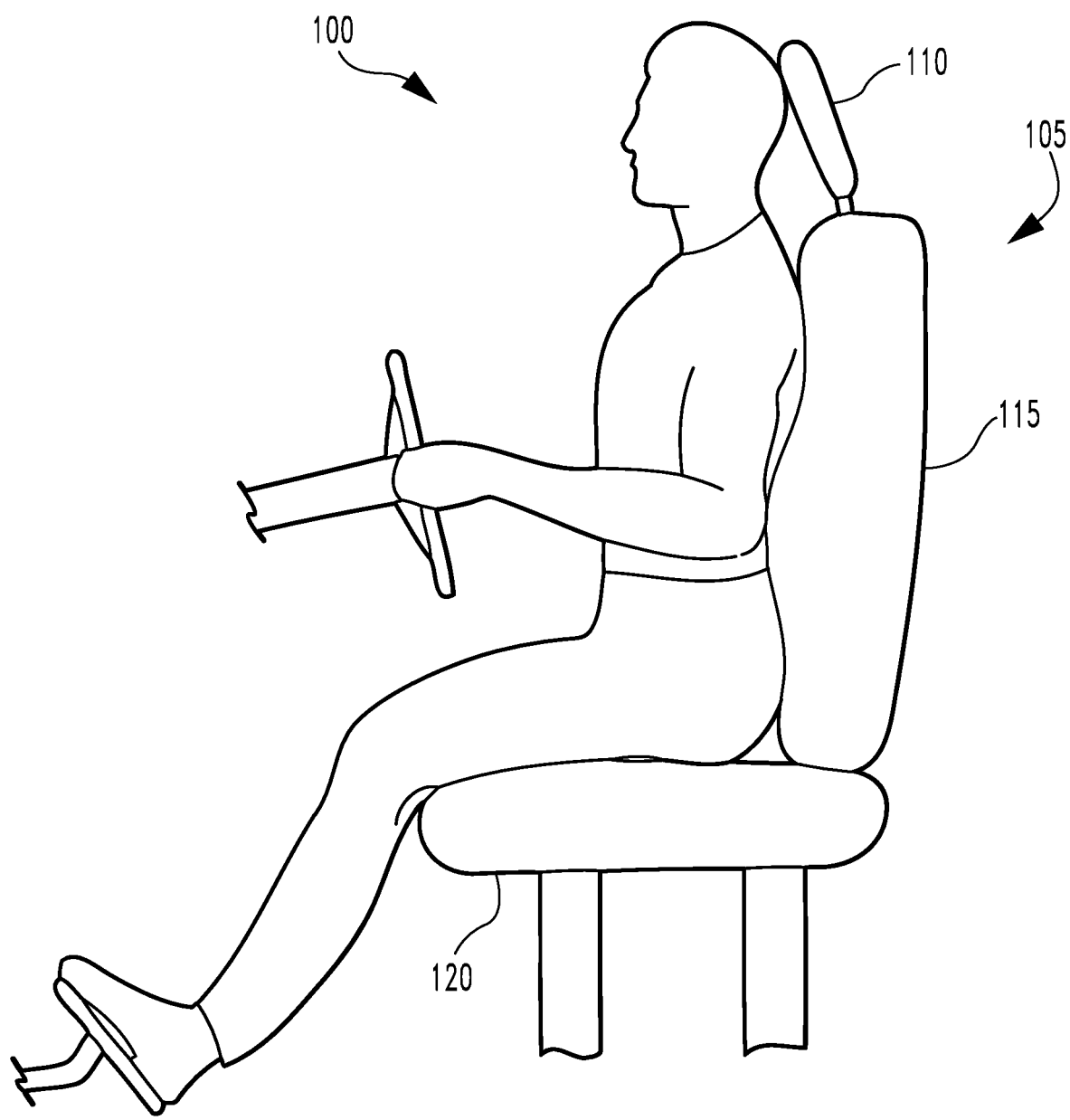
FIG. 1 is a side view of a vehicle seat and a passenger seated therein.

For the purpose of promoting an understanding of the principles of the disclosure, reference will now be made to the embodiments illustrated in the drawings and specific language will be used to describe the same. It will nevertheless be understood that no limitation of the scope of the disclosure is thereby intended. Any alterations and further modifications in the described embodiments, and any further applications of the principles of the disclosure as described herein are contemplated as would normally occur to one skilled in the art to which the disclosure relates. One embodiment of the disclosure is shown in great detail, although it will be apparent to those skilled in the relevant art that some features that are not relevant to the present disclosure may not be shown for the sake of clarity.

A vehicle seating system may be used to reduce user fatigue and other undesirable effects of long distance traveling. Such a system includes a typical vehicle seat mountable in a vehicle, at least two powered seat adjustment actuators, and an electrical controller. Various embodiments of the system can be used within automobiles, trains, and/or airplanes, as examples. The actuators are moveable to alter the seating position formed by the seat, reducing positional fatigue of the user. The actuators preferably reposition the seat to different seating positions with a slow movement average of typically less than about 10 centimeters per second. The electrical controller has a control period which generally includes at least one movement period and, in certain embodiments, at least one stationary period. In a typical embodiment, the electrical controller initiates the control period after a first time period beginning when the vehicle is turned on. Thereafter, the control period preferably includes at least one movement period where the actuators automatically cycle through seating positions and reposition the user to reduce long distance traveling fatigue.

FIG. 1 illustrates a passenger 100 seated in a vehicular seat 105. A typical vehicular seat includes a head rest 110, a seat back 115, and a seat bottom 120. As illustrated in FIG. 1, the passenger is operating a motor vehicle by using a typical steering wheel and pedal system.

Figure 2:
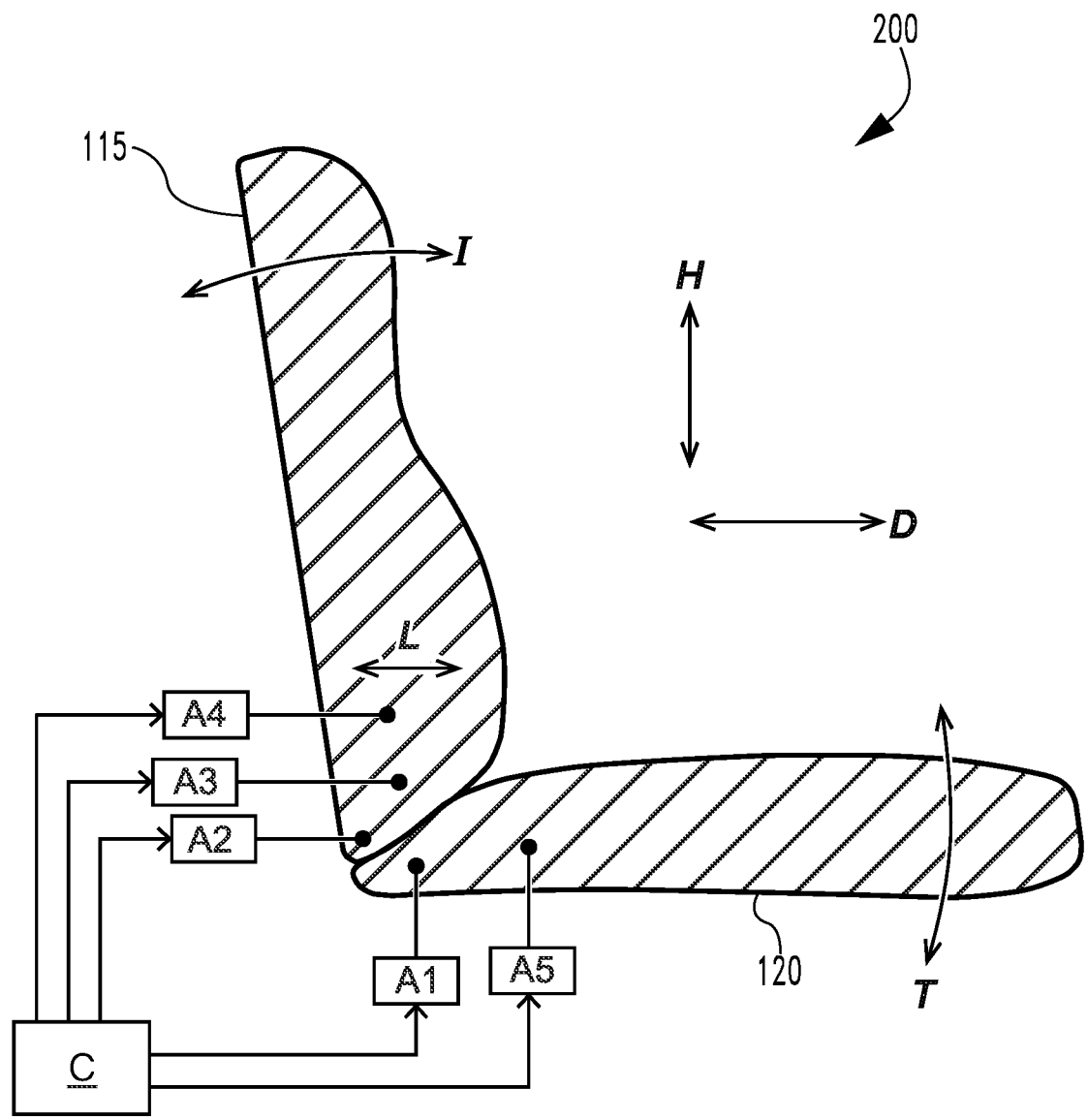
FIG. 2 is a side, partial cross-sectional view of a vehicle seating system.

FIG. 2 illustrates components of a vehicle seating system 200 designed to reduce passenger positional fatigue. It should be appreciated that the system can be associated with any type of vehicular seat. System 200 includes various powered seat adjustment actuators configured to move seat back 115 and seat bottom 120 in various manners, thereby altering the seating position formed by the seat. Certain typical embodiments include five actuators, such as a first actuator A1 to move both the seat back and the seat bottom in a generally vertical direction along a height axis H and a second actuator A2 to move both the seat back and the seat bottom in a generally horizontal direction along distance axis D. Movement along the distance axis D alters the distance that the seat is positioned relative to a steering wheel and pedal system for a driver's seat. A third actuator A3 is configured to move a lumbar region of the seat back along a lumbar axis L. A fourth actuator A4 and a fifth actuator A5 operate to incline or tilt the seat back along an I axis and the seat bottom along a T axis, respectively. The actuator power may be by motor, servo motor, stepper motor, pneumatics, hydraulics, and/or otherwise.

In preferred embodiments, movement of the actuators includes a slow movement average of less than about 10 centimeters per second. In certain embodiments, each actuator moves from a first position to a second position, and cycling of the actuators includes movement from the first positions to the second positions and returning to the first positions. In certain embodiments, the first position of each actuator is a base position and the second position of each actuator is the opposite, completely extended position of each actuator along the respective axis. However, in certain other embodiments, the first position of each actuator is a desired position, predetermined by the system or a user of the system.

System 200 generally includes an electrical controller C to automatically activate, operate, and cycle through the various actuators in a manner as to reduce positional fatigue. The electrical controller operates in conjunction with a microprocessor and/or computer chip technology to operate the system. The electrical controller preferably includes a control period. In certain preferred embodiments, the electrical controller initiates the control period when the vehicle is turned on. The control period can include a first stationary time period before movement begins. In certain other preferred embodiments, the electrical controller initiates the control period after passage of a first stationary time period, the first time period beginning when the vehicle is turned on. In certain preferred embodiments, the first stationary time period is about 20 minutes. In other preferred embodiments, the first stationary time period is about 30 minutes. However, it should be appreciated that the control period can begin at other appropriate times as would generally occur to one skilled in the art.

In certain embodiments, the control period includes at least one fatigue period of at least ten minutes. In a preferred embodiment, the fatigue period includes at least one segment of time in which at least one actuator is moving to reposition the vehicle seat. The control period preferably includes at least one movement period, the movement period including movement of at least one actuator. In certain preferred embodiments, the control period includes at least one movement period and at least one stationary period in which the actuators are motionless. In certain embodiments, the stationary period is at least 5 minutes in duration. In certain embodiments, the control period ends when the vehicle is turned off.

In certain preferred embodiments, the electrical controller is activated automatically when the vehicle is turned on. Additionally, the electrical controller can preferably be manually activated and de-activated by a user of the system. In such embodiments, a user of the system can manually switch the electrical controller on and off as desired. Additionally, in certain embodiments, the electrical controller is de-activated when the vehicle is turned off.

Figure 3:
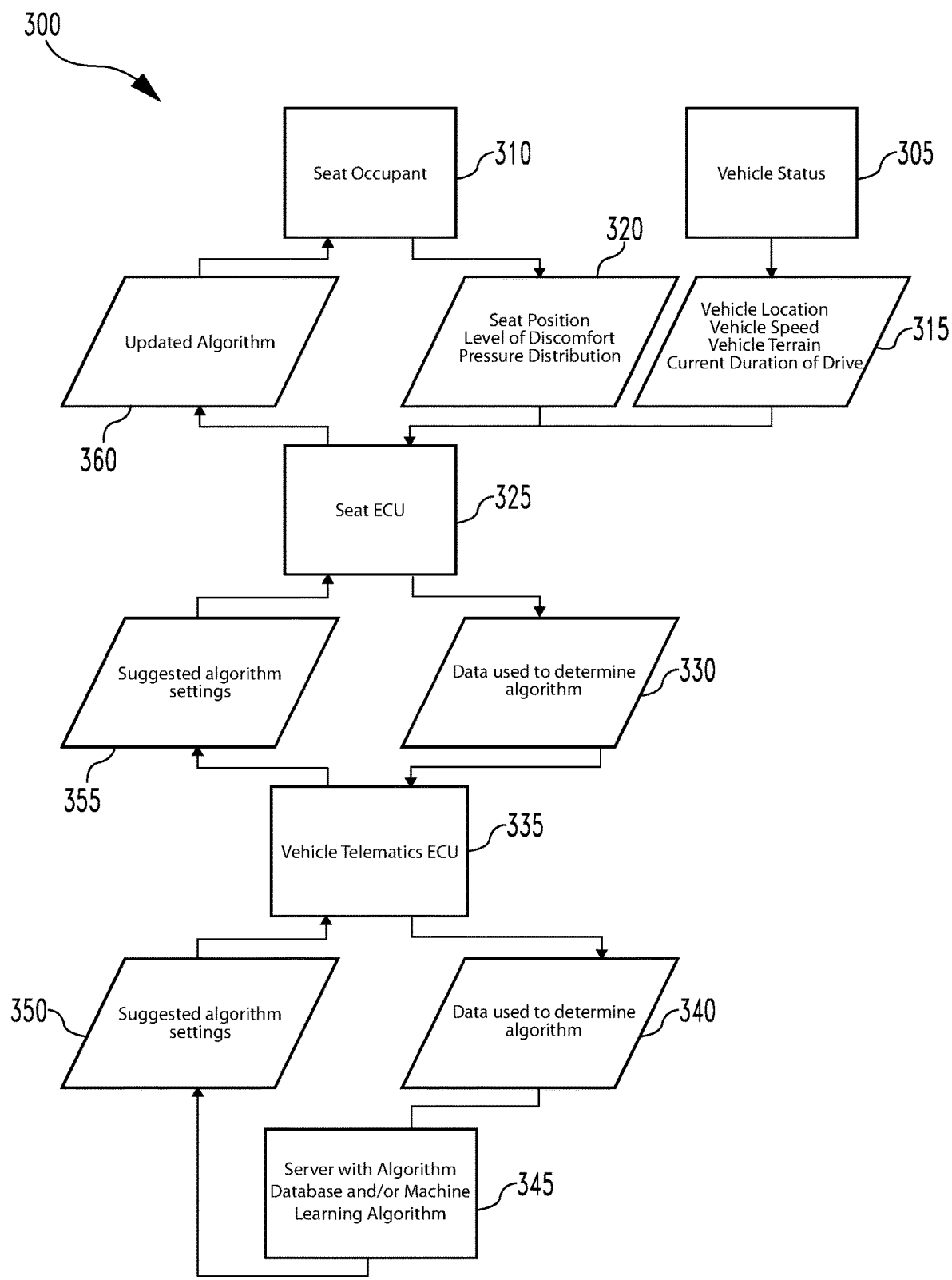
FIG. 3 is a flow diagram of an algorithm adjustment process.

FIG. 3 shows flow diagram of a seat adjustment process 300. The seat adjustment process 300 begins at stage 305. In stage 305, vehicle status data may be gathered. Simultaneously, in stage 310 seat occupant data may be gathered. In one embodiment, vehicle status and seat occupant data may be gathered by a variety of sensors positioned in and around the vehicle. In another embodiment, vehicle status and seat occupant data may be manually entered into a vehicle infotainment system. In yet another embodiment, a combination of user inputted data and sensor data is used to obtain vehicle status and seat occupant data.

Stage 315 shows a few examples of vehicle status data. For example, vehicle status data may include vehicle location, vehicle speed, vehicle terrain (sand, snow, rock, mud, and/or highway to name a few), vehicle drive duration, ride goal (comfort, fatigue mitigation, relaxation, and/or sport to name a few), road conditions (icy, wet, dry, rough, and/or smooth to name a few), suspension height, suspension softness, and/or vehicle type.

Stage 320 shows a few examples of seat occupant data. For example, seat occupant data may include occupant weight, occupant height, occupant age, occupant medical history, occupant fatigue level, occupant seat location, occupant positioning, occupant weight distribution, and/or occupant feedback. In stage 325, the vehicle status and seat occupant data may be transferred to a controller. In one example, the controller may be a seat Electronic Control Unit (ECU). The controller may be configured to receive the vehicle status and seat occupant data wirelessly, via a Control Area Network (CAN), and/or via a direct hard-wired connection.

In stage 330, the compiled vehicle status and seat occupant data is transferred from the seat ECU to a vehicle telematics ECU. The vehicle telematics ECU receives the vehicle status and seat occupant data in stage 335. Similar to what has been described previously; the seat ECU to vehicle telematics ECU data transfer may be done wirelessly, via CAN, and/or via a direct hard-wired connection.

In stage 340, the vehicle status and seat occupant data is transferred from the vehicle telematics ECU to a remote device. In an example embodiment, the transfer may be wireless. In another embodiment, the wireless transfer may be 5G. In yet another embodiment, the wireless transfer may be Bluetooth. In a further embodiment, the wireless transfer may be WiFi. The remote device may be a remote computer, a remote server, and/or a remote database. Generally, the remote device creates one or more seat adjustment inputs. In one example, the seat adjustment input may be a seat adjustment algorithm. In another example, the seat adjustment input may be an algorithm selection key. In a further example, the remote device holds a master seat adjustment algorithm. In stage 345, the master seat adjustment algorithm may be adjusted based on the received vehicle status and seat occupant data. In this manner, the seat adjustment algorithm may be personalized and configured to place each user in an optimal position based on the inputted information. Additionally, the actuator movements executed by the seat adjustment algorithm are configured to adjust based on the received information to provide superior anti-fatigue properties.

At stage 350, the personalized seat adjustment algorithm calculated in stage 345 may be transferred back to the vehicle telematics ECU in the same manner as was described previously, in one example 5G transmission. Shown at stage 355, the personalized seat adjustment algorithm may be further transferred from the vehicle telematics ECU to the seat ECU in the same manner as was discussed previously.

In stage 360, the seat ECU outputs the personalized seat adjustment algorithm to one or more seat actuators as discussed in FIG. 2. Generally, the personalized seat adjustment algorithm is configured to adjust one or more of the following: actuation frequency, actuation magnitude, actuation type, actuation patterns, and/or any combination thereof. The actuation type may be further controlled to determine seat motion, seat heating/cooling, and/or vehicle environmental changes such as lighting, mirror positioning, and/or ambient temperature.

Other methods of controlling the seat actuators are envisioned with select embodiments described below. In one embodiment, the vehicle status and seat occupant data may be sent to the remote device for creation of an algorithm selection key. The algorithm selection key may be a number corresponding to a particular seat adjustment algorithm stored locally on a seat ECU. For example, the remote device receives the inputs of seat occupant and vehicle status information and calculates an algorithm selection key, which is transferred to the seat ECU. The seat ECU then selects the seat adjustment algorithm corresponding to the algorithm selection key that is optimized for the seat occupant and vehicle status.

In another example, the seat ECU includes a base seat adjustment algorithm. The base seat adjustment algorithm is not personalized and is sent in combination with the vehicle status and seat occupant data to the remote device. The remote device combines the seat occupant data, vehicle status data, and the base seat adjustment algorithm to create a new personalized seat adjustment algorithm. The personalized seat adjustment algorithm is then sent back to the seat ECU for activation.

Figure 4:
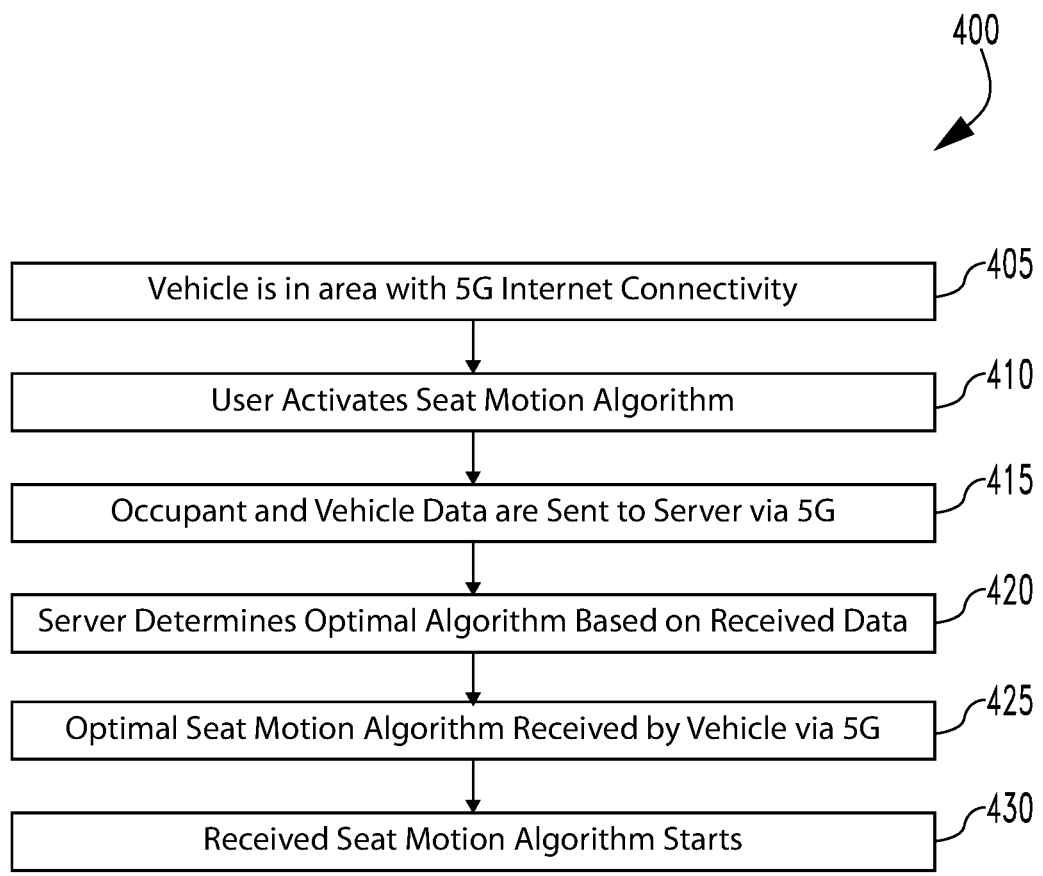
FIG. 4 is a flow diagram of a wireless algorithm selection process.

Shown in FIG. 4 is a flow diagram showing an example of a wireless algorithm selection process 400. In stage 405, the vehicle checks to assure a connection with a wireless communication system. In the present example, the wireless communication system is 5G. In another example, the wireless communication system may be Bluetooth. Typically, the vehicle checks for a connection with the wireless communication system upon start-up. In some examples, if no wireless connection is found, an error message may appear on the vehicle dashboard. Occasionally, especially in rural areas, vehicle internet connectivity may disconnect and reconnect periodically.

In stage 410, the seat occupant (user) activates the seat adjustment algorithm. In one embodiment, the seat adjustment algorithm is activated through an icon on a vehicle's infotainment system. In another embodiment, the seat adjustment algorithm is activated by a manual button on a vehicles instrument cluster. In yet another embodiment, the seat adjustment algorithm is activated through a smartphone app associated with the vehicle. In a further embodiment, the seat adjustment algorithm is automatically activated upon vehicle start-up.

In stage 415, the vehicle status and seat occupant data may be gathered and transferred wirelessly to the remote device. As has been discussed previously, the vehicle status and seat occupant data may be gathered manually and inputted into the vehicle infotainment system. Optionally, the vehicle status and seat occupant data may be gathered by one or more sensors and automatically transferred to the remote device. In another embodiment, the vehicle status and seat occupant data may be gather manually and inputted into a smartphone app associated with the vehicle.

In stage 420, the remote device receives the vehicle status and seat occupant data and adjusts the seat movement algorithm according to the received data. Following this, the optimized seat movement algorithm may be transferred back to the vehicle and received by the seat ECU in stage 425. In stage 430, the optimized seat movement algorithm begins controlling the seat actuators until a further change to the algorithm is needed. For example, if the road conditions were to become icy, the algorithm may adjust to account for the greater focus needed by a driver.

Figure 5:
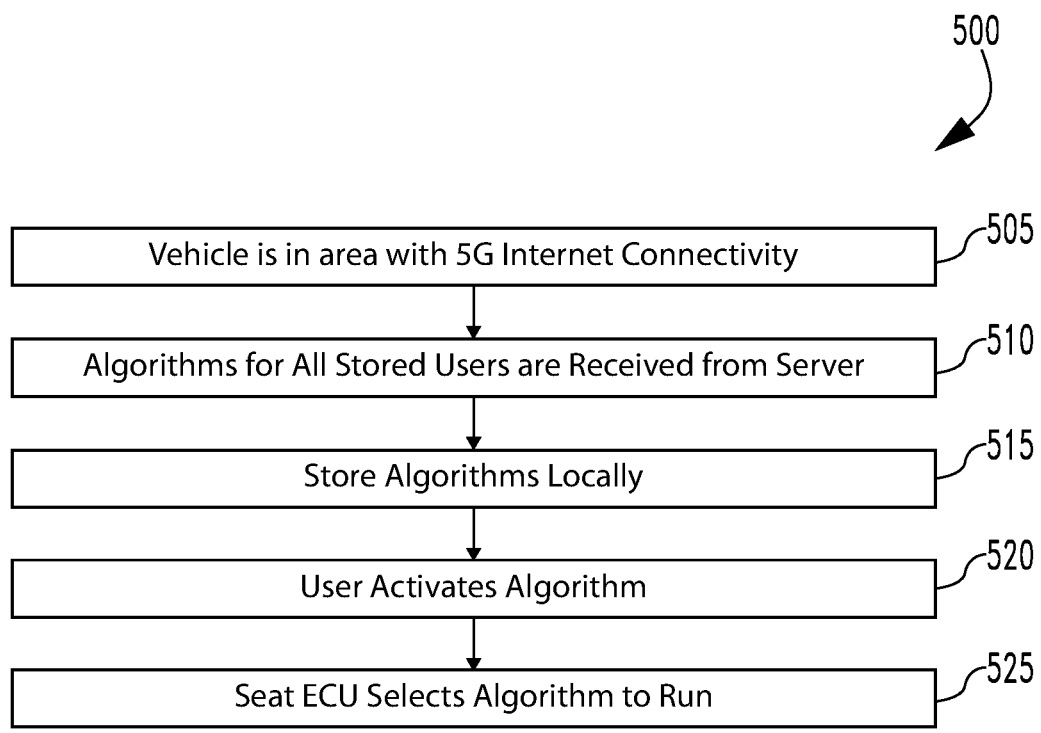
FIG. 5 is a flow diagram of a pre-loaded algorithm selection process.

FIG. 5 shows a flow diagram outlining a pre-loaded algorithm selection process 500. The pre-loaded algorithm selection process 500 may be utilized in areas with poor or "spotty" cellular or internet connectivity. Alternatively, a user may prefer this method even when internet connectivity is constant. Beginning at stage 505, the vehicle attempts to connect to the internet. If successful, shown in stage 510, the personalized algorithms are downloaded to the seat ECU from the remote device. In one example, each vehicle occupant has a user profile corresponding to his or her biometric information and seat movement preferences. The user profile indicates to the remote device the proper seat adjustment algorithms to send to the seat ECU. In another embodiment, there are no created user profiles for the remote device to reference. In this case, the remote device will send a list of the most commonly used seat adjustment algorithms for a user to select from.

As was mentioned previously, in stage 515 the seat adjustment algorithms are sent to the seat ECU and stored until activated by a user. Because the seat movement algorithms are stored locally, internet connectivity is no longer needed to access the personalized seat movement algorithms. In stage 520, a user activates a seat adjustment algorithm. Generally, the user activates a general seat adjustment algorithm in the method described in FIG. 4. In another embodiment, the seat adjustment algorithm is automatically selected by the seat ECU and began without user input upon vehicle start-up. In stage 525, the seat ECU selects the optimal seat adjustment algorithm to run based on the determined user profiles discussed previously. For example, the seat ECU determines the driver to be user A, therefore the seat ECU may apply one of user A's seat adjustment algorithms saved to user A's user profile. In another embodiment, the user does not have a user profile with associated seat adjustment algorithms. In this case, the seat ECU may select the user profile most similar to the current user. In one example, the similarity may be based on user biometrics information.

Figure 6:
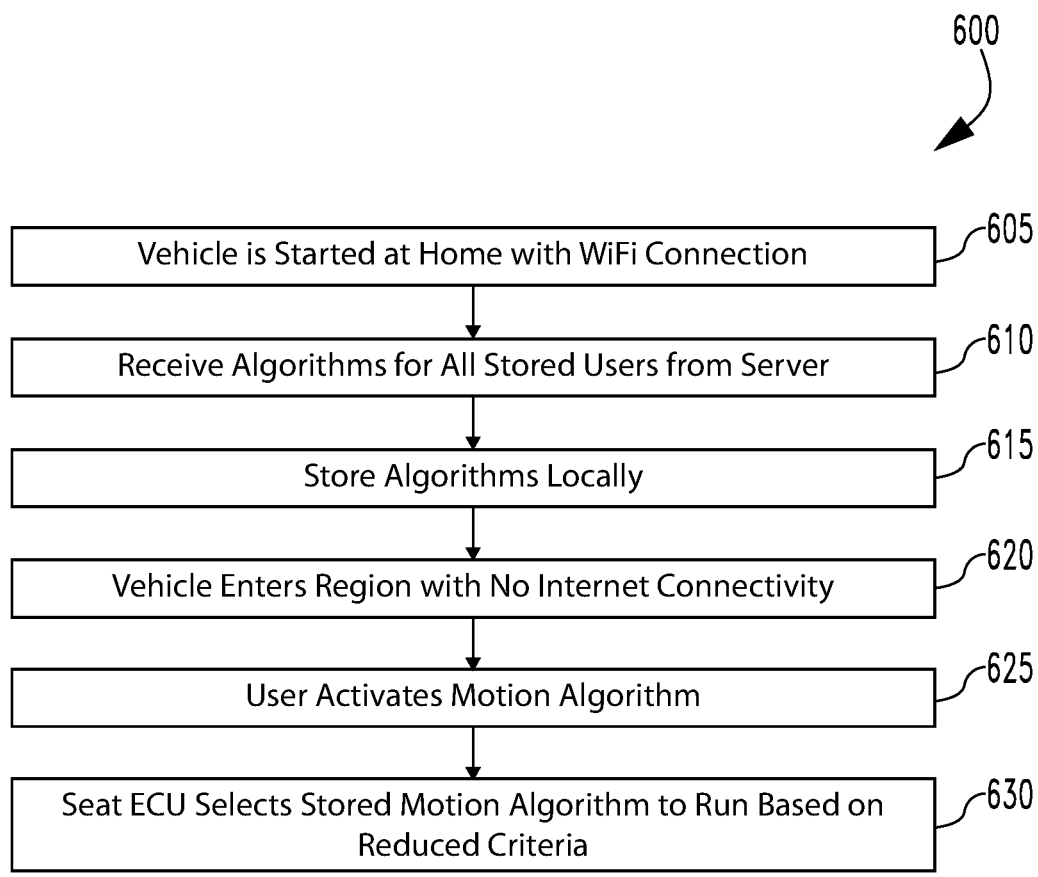
FIG. 6 is a flow diagram of a hybrid algorithm selection process.

In FIG. 6 an example of a flow diagram of a hybrid algorithm selection process 600 is shown. The hybrid algorithm selection process 600 may be suited for users who prefer not to have their vehicle connected to the internet at all times. Additionally, this method may work for vehicles that are older and unable to be constantly connected to the internet via 5G or otherwise. Beginning at stage 605, a vehicle is started within range of a known or "safe" network. The known network may be a home WiFi network, a work WiFi network, a hotel WiFi network, and/or any other network deemed "safe" by a user. Once the vehicle is started within range of a known network the internet connection may be automatic. Additionally, known networks may be saved or programed into the vehicle infotainment center for ease of connectivity in the future.

In stage 610, the seat ECU receives the seat adjustment algorithms from the remote device corresponding with the known user profiles. This step is similar to that described in FIG. 5. Stage 615 stores the seat adjustment algorithms in the seat ECU for reference by a user. This stage is likewise similar to that described in FIG. 5.

In stage 620, the vehicle leaves the connectivity region for the known network, at this point, the vehicle may be disconnected from any source of internet access. In this scenario, the vehicle enters into a reduced capability mode. However, due to the previously downloaded user profiles the seat adjustment algorithms are accessible and usable by a user.

In stage 625, a user activates the seat adjustment algorithm in the manner discussed previously. As has been discussed, the seat adjustment algorithm may be automatically activated by the seat ECU. Shown in stage 630, once the seat adjustment algorithm has been activated, the seat ECU selects the optimal algorithm for a user based on previously downloaded options. Similar to what was described in FIG. 5, the seat ECU may select an adjustment algorithm based on user biometrics information. Optionally, the seat ECU may select an adjustment algorithm based on time of day or vehicle drive duration.

Figure 7:
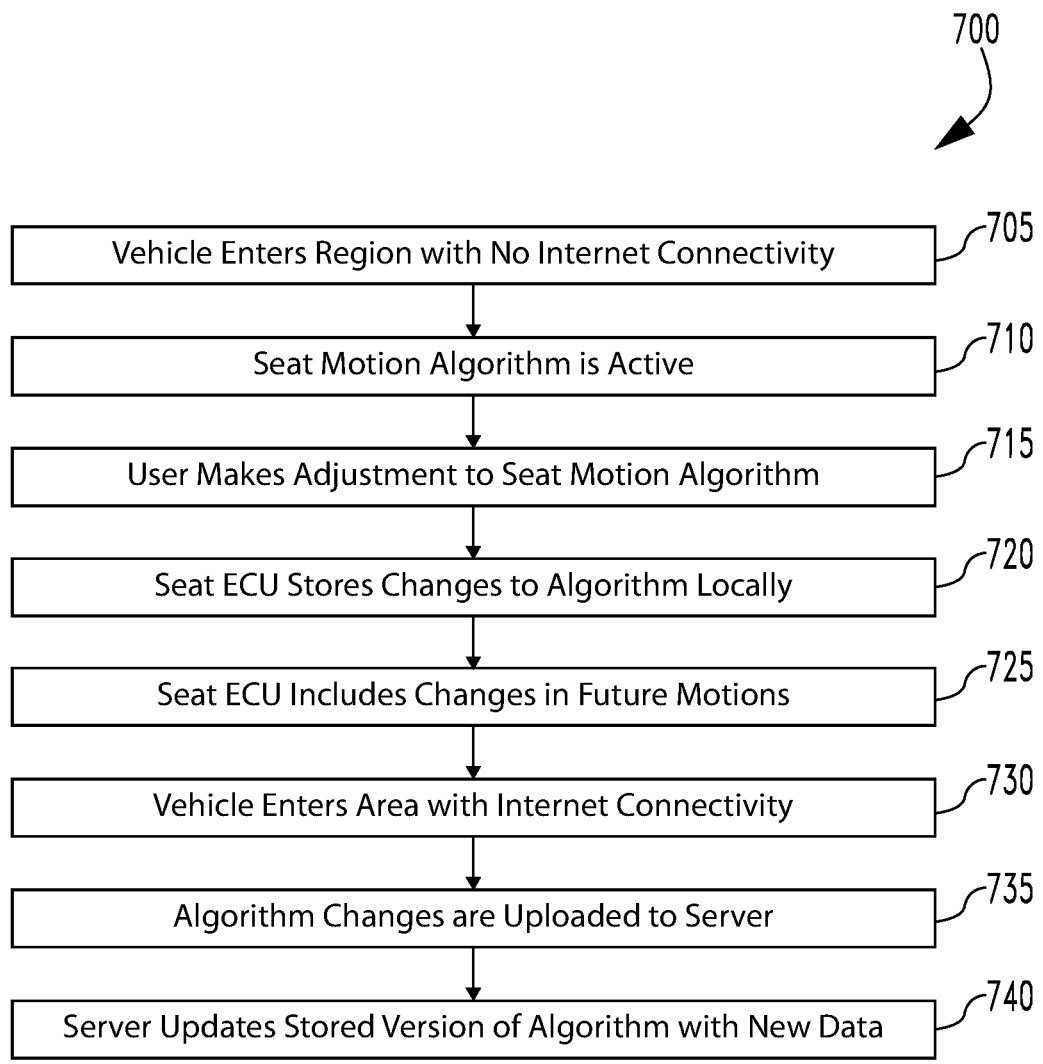
FIG. 7 is a flow diagram of a hybrid algorithm adjustment process.

Turning to FIG. 7, a flow diagram of a hybrid algorithm adjustment process 700 is shown. The hybrid algorithm adjustment process 700 allows for changes to be made to the seat adjustment algorithm even when there may be no internet connection and the remote device is not in connection with the vehicle ECU. This allows a user to further personalize the seat adjustment algorithm on-the-fly. Additionally, this prevents a user from being forced into undesirable or uncomfortable positions by the seat adjustment algorithm.

In stage 705, the vehicle proceeds into a region with no internet connectivity. During this time, as shown in stage 710, the seat adjustment algorithm is active. In the event that a user finds the position set by the seat adjustment algorithm to be uncomfortable, the user may manually adjust the seat to a more comfortable position as shown in stage 715. In another embodiment, the user may select a thumbs up/down on the vehicle infotainment system to indicate the position may be uncomfortable. In yet another embodiment, the user may select a thumbs up/down on a smartphone app associated with the vehicle.

Shown in stage 720, the seat ECU records the manual change or user input regarding the seat position and adjusts the seat algorithm locally to avoid the undesirable position. Shown in stage 725, the seat adjustment algorithm continues to run, but the seat ECU prevents the seat adjustment algorithm from moving the user into the undesirable position. In stage 730, the vehicle enters an area where the internet connectivity is reestablished and a connection to the remote device is reconnected.

At stage 735, the seat ECU reconnects to the remote device and transfers the user inputs/locally updated algorithm to the remote device. The remote device then updates the seat adjustment algorithm to reflect the user changes and, in stage 740, the server saves the adjusted seat algorithm over the previous version to avoid placing the user in the undesirable position.

Figure 8:
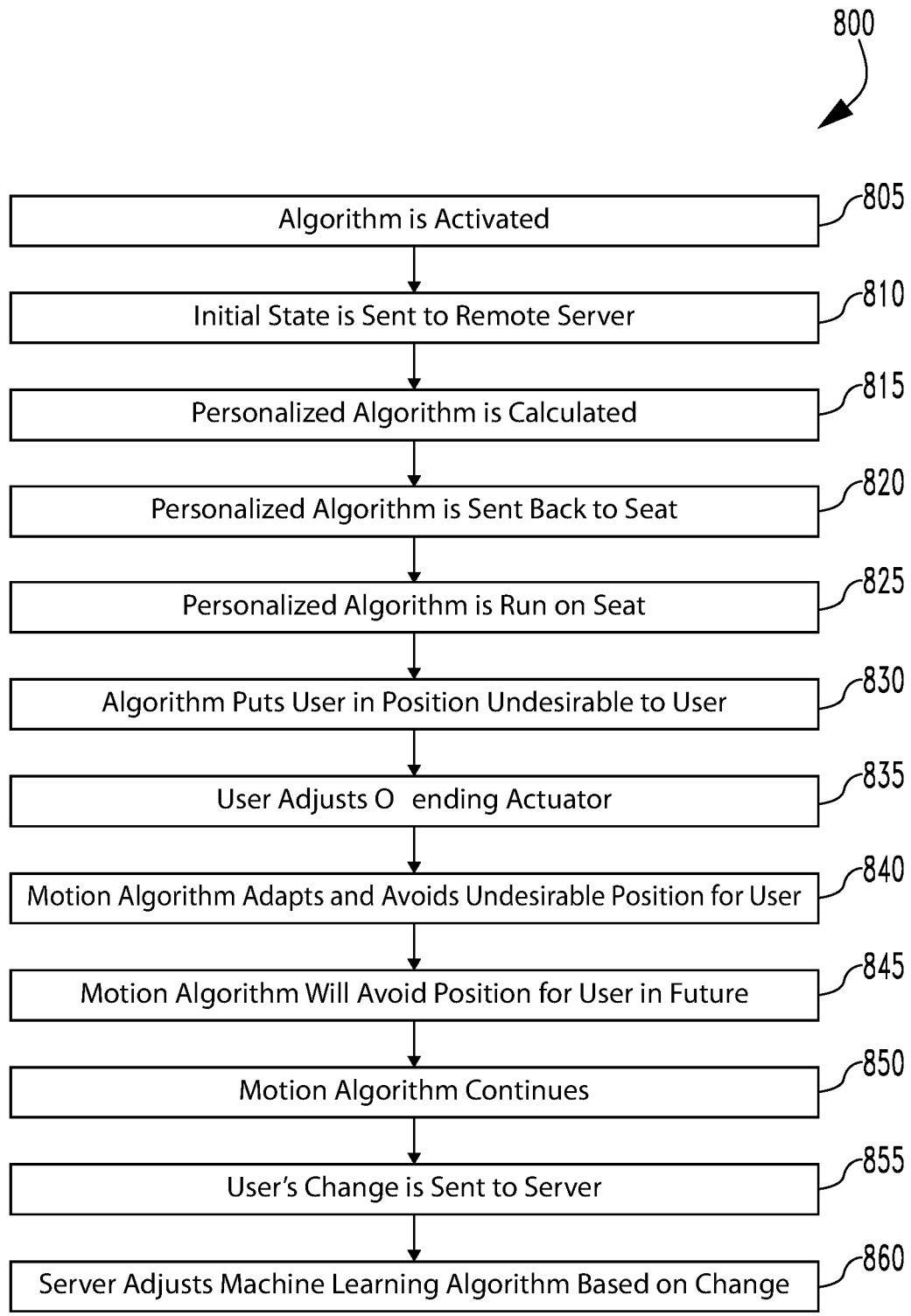
FIG. 8 is a flow diagram of an algorithm learning process.

In FIG. 8, a flow diagram of an algorithm learning process 800 is shown. The algorithm learning process 800 may be utilized by a user to create an optimal seat movement algorithm. In stage 805, the user activates the seat adjustment algorithm. As has been discussed previously, the seat movement algorithm may be activated by a manual button on the dashboard, a smartphone app, a setting on a vehicle infotainment system, and/or automatically by the seat ECU.

In stage 810, the vehicle status and seat occupant data is sent to the remote device to create an initial state. The initial state may be a set of data used by the remote device to calculate an initial seat adjustment algorithm as shown in stage 815. In stage 820, the calculated seat adjustment algorithm is sent back to the seat ECU. In stage 825, the seat adjustment algorithm begins adjusting the seat actuator movement. If the seat adjustment algorithm places the user into an undesirable or uncomfortable position as shown in stage 830, the user may adjust the seat as shown in stage 835. As was discussed previously, the user may adjust the seat in a number of ways. In one example, the user may manually adjust the seat to move into a more comfortable positon. In another example, the user may provide feedback through a thumbs up/down button on a smartphone app or a vehicle infotainment system.

In stage 840, the seat adjustment algorithm notes the user input and adapts to avoid the offending movement position. In stage 845, the seat adjustment algorithm continues to control seat actuator movement as shown in stage 850 while avoiding the offending seat movement. In stage 855, the adjusted seat movement algorithm may be sent from the seat ECU back to the remote device. In stage 860, the remote device receives the adjusted seat movement algorithm and saves the algorithm over the previous version. This method allows the seat adjustment algorithm to remain current as to the preferences of a particular user and to avoid the offending movement in the future.

Figure 9:
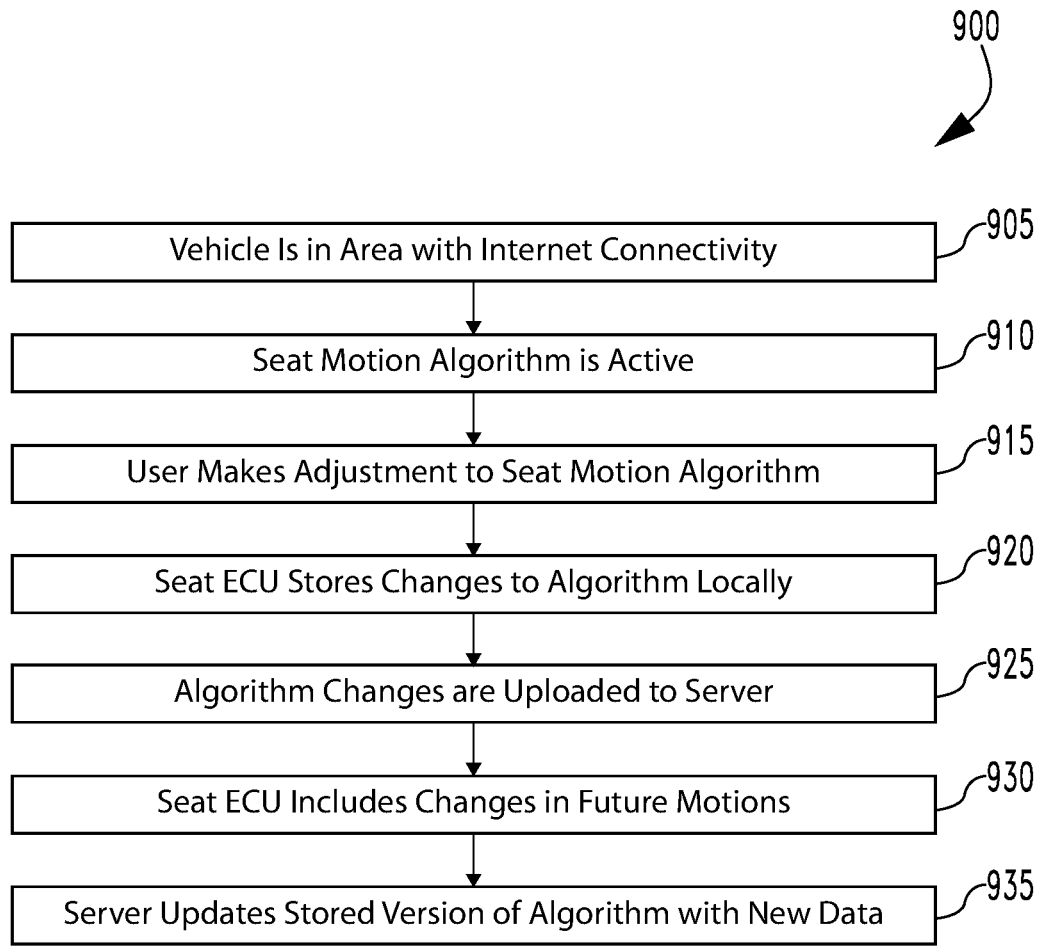
FIG. 9 is a flow diagram of a wireless algorithm adjustment process.

In FIG. 9, a flow diagram of a wireless algorithm adjustment process 900 is shown. Similar to what has been described in FIG. 8, the wireless algorithm adjustment process 900 enables a user to modify the seat adjustment algorithm instantaneously if placed in an uncomfortable or undesirable position. In stage 905, the vehicle may be in an area where internet connectivity is available as the seat adjustment algorithm is operating as shown in stage 910. In stage 915, the user makes an adjustment to the seat to avoid an uncomfortable position that was created by the seat adjustment algorithm. As was discussed previously, the user may adjust the seat in a number of ways. In one example, the user may manually adjust the seat to move into a more comfortable positon. In another example, the user may provide feedback through a thumbs up/down button on a smartphone app or a vehicle infotainment system.

In stage 920, the seat ECU records the change made to the seat adjustment algorithm and adjusts the algorithm locally. The local algorithm change is saved to the seat ECU as an updated/adjusted version of the seat adjustment algorithm. In stage 925, the local algorithm adjustments are uploaded to the remote device. In stage 930, the seat ECU uses the new updated seat adjustment algorithm to control the seat actuators. In stage 935, the remote device updates the stored seat adjustment algorithm with the new user adjusted algorithm. This newly updated algorithm may be saved as the new seat adjustment algorithm for that particular user.

Figure 10:
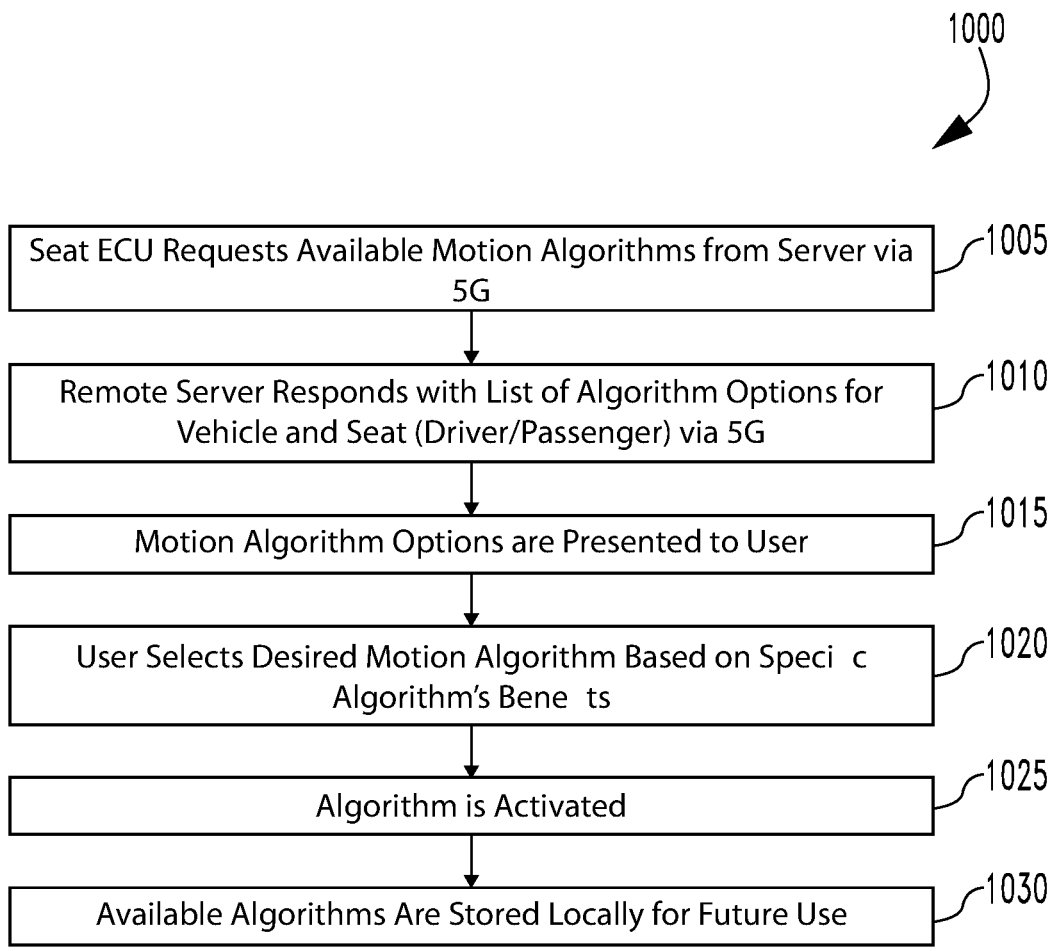
FIG. 10 is a flow diagram of a user selected seat adjustment algorithm.

FIG. 10 shows a flow diagram of a user selected seat adjustment algorithm process 1000. The user selected seat adjustment algorithm process 1000 allows a user to select a particular seat adjustment algorithm based on the benefit. In this way, the user is able to predict the types of movements made by the seat adjustment algorithm. For example, a user selecting an anti-fatigue algorithm may expect less movement than a user selecting a sport algorithm. In stage 1005, the seat ECU requests the remote device to send over all of the available seat adjustment algorithms to the seat ECU. In stage 1010, the remote device sends over the seat adjustment algorithms based on a driver profile. For example, the seat ECU may send the remote device the seat occupant data. The remote device will use the seat occupant data to select the proper seat adjustment algorithms to send. In stage 1015, the seat adjustment algorithms are shown to a user for selection. In one example, the seat adjustment algorithms are shown to a user on a vehicle infotainment system. In another example, the seat adjustment algorithms are shown to a user on a smartphone application. In yet another example, the seat adjustment algorithms are voiced to a user over a vehicle sound system.

In stage 1020, the user selects a seat adjustment algorithm based on the perceived benefit. For example, a user may select a seat adjustment algorithm designed to provide anti-fatigue properties. In another example, a user may select a seat adjustment algorithm designed to provide maximum comfort. In yet another example, a user may select a seat adjustment algorithm designed to provide maximum road visibility. In stage 1025, the user activates the selected algorithm via a manual button on the dashboard, a smartphone application, and/or the vehicle infotainment system. Optionally, the algorithm is automatically activated by the seat ECU once selected by a user. In stage 1030, the seat adjustment algorithms sent from the remote device to the seat ECU are stored in the seat ECU for future reference. For example, if a user determines a need to change the seat adjustment algorithm from an anti-fatigue mode to a sport mode the user will select the new seat adjustment algorithm. Similar to before, the seat adjustment may be selected in a multitude of ways. In one example, the seat adjustment algorithms are shown to a user on a vehicle infotainment system. In another example, the seat adjustment algorithms are shown to a user on a smartphone application. In yet another example, the seat adjustment algorithms are voiced to a user over a vehicle sound system.

Figure 11:
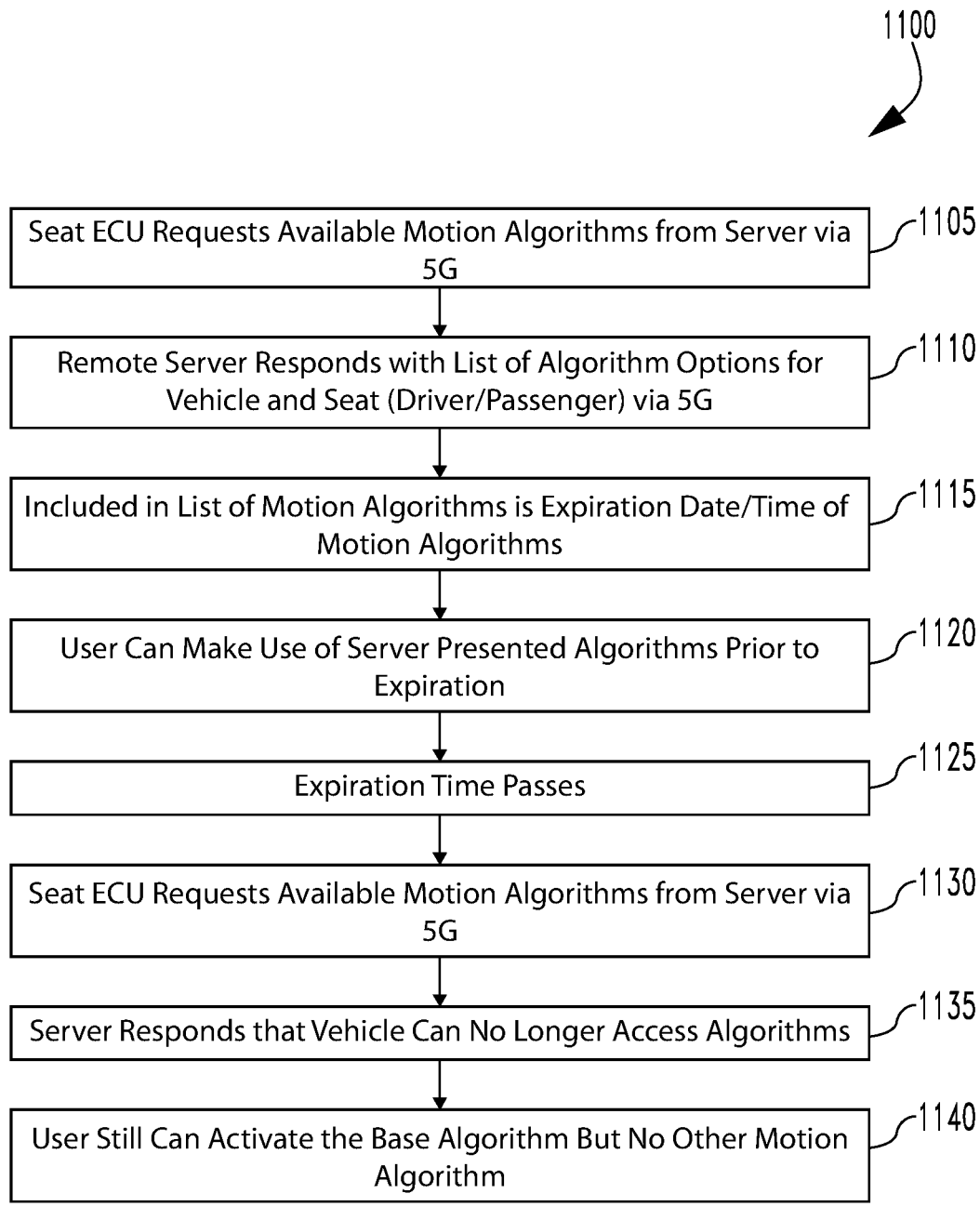
FIG. 11 is a flow diagram of a seat adjustment algorithm subscription model.

FIG. 11 shows a flow diagram of a seat adjustment algorithm subscription model 1100. The seat algorithm subscription model 1100 provides a user access to the personalized seat adjustment algorithms for a limited time based on purchased time durations. For example, a user may purchase access to the personalized seat adjustment algorithms for a day, a week, a month, three months, six months, a year, five years, and/or any combination thereof. In another example, once the subscription to the personalized seat adjustment algorithm expired, the user will retain access to a basic seat adjustment algorithm saved to the seat ECU. However, in order for a user to retain access to personalized seat adjustment algorithms via the remote device, a subscription may be required.

At stage 1105, the seat ECU requests the remote device to send over all available seat adjustment algorithms. The remote device references the user profiles associated with the vehicle and provides a list of optional seat adjustment algorithms in stage 1110. As a user views the list of available seat adjustment algorithms, the expiration date of the subscription may be shown as in stage 1115. For example, if a user paid for a two year subscription on Nov. 17, 2020 and selects a personalized anti-fatigue seat adjustment algorithm, the algorithm would show an expiration date of Nov. 17, 2022. In another example, if a user selects a basic comfort seat adjustment algorithm, the algorithm would show no expiration date because the basic algorithms may not be tied to the subscription model access. In another example, each type of seat adjustment algorithm (personalized/basic) may be tied to the subscription and are unavailable once the subscription has expired.

Until the expiration date is reached, the user may activate any of the seat adjustment algorithms at will as shown in stage 1120. However, once the expiration date is passed shown at stage 1125, if another subscription has not been purchased/extended the personalized seat adjustment algorithms may be unavailable. For example, the seat ECU sends a request to the remote device after the expiration period in stage 1130; the remote device returns an error signal in stage 1135. The error signal may appear on a vehicle infotainment system, a smartphone application associated with the vehicle, and/or on the vehicles dashboard. The user may still activate one of the basic seat adjustment algorithms saved to the seat ECU without a subscription as shown in stage 1140.

Figure 12:
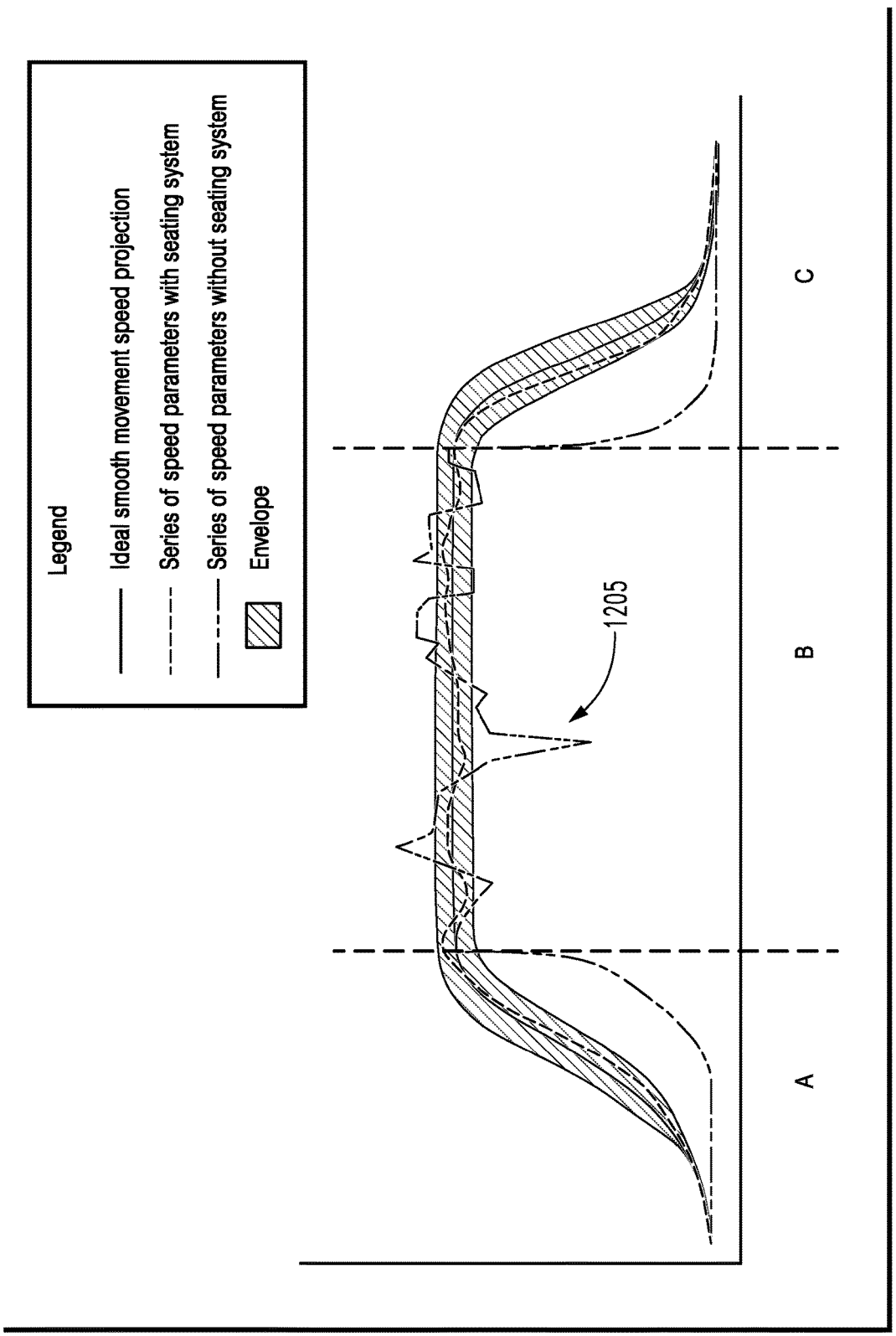
FIG. 12 is a graphic illustration of an example of a smooth movement speed projection and series of speed parameters.

In addition to the subscription model working for a singular vehicle an enhanced subscription may be purchased for multiple vehicles. For example, if a user purchased a subscription for unlimited vehicles, the personalized seat adjustment algorithms may be available in any vehicle a user rides in. However, the vehicle may require internet connectivity and seat actuators compatible with the seat adjustment algorithms. This may be particularly advantageous in ride sharing applications. In another example, the seat adjustment algorithms are applicable across a range of vehicular types including, but not limited to planes, trains, busses, cars, boats, and/or any combination thereof. This method would allow a user to run a personalized seat adjustment algorithm when on a long flight or train ride. However, the vehicle may require internet connectivity and seat actuators compatible with the seat adjustment algorithms An example of a speed projection profile overlaid with series of speed parameters is shown in FIG. 12. FIG. 12 shows three time segments A, B, and C, which correspond to a seat adjustment actuator being inactive, active, and inactive respectively. For the example figure, the X axis corresponds to time and the Y axis corresponds to speed. An example ideal smooth movement speed projection is shown in FIG. 12. The example ideal smooth movement speed projection gradually moves from rest to a target speed, the speed is constant at the target speed throughout the segment that the actuator is commanded active, and the speed gradually returns to rest. FIG. 12 also depicts an example envelope set by minimum and maximum values corresponding to an optional smooth speed projection. FIG. 12 shows an example series of speed parameters following within this optional envelope when using this aspect. U.S. Pat. Nos. 7,422,285 and 9,187,020 are incorporated by reference. Another series of speed parameters is shown falling outside of the envelope when the seating system is not used. Element 1205 specifically shows an example speed parameter falling outside of the envelope when the seating system is not used.

Glossary of Terms and Alternative Wordings

While the disclosure has been illustrated and described in detail in the drawings and foregoing description, the same is to be considered as illustrative and not restrictive in character, it being understood that only the preferred embodiment has been shown and described and that all changes, equivalents, and modifications that come within the spirit of the disclosure defined by following claims are desired to be protected. All publications, patents, and patent applications cited in this specification are herein incorporated by reference as if each individual publication, patent, or patent application were specifically and individually indicated to be incorporated by reference and set forth in its entirety herein.

Singular forms "a", "an", "the", and the like include plural referents unless expressly discussed otherwise. As an illustration, references to "a device" or "the device" include one or more of such devices and equivalents thereof.

Directional terms, such as "up", "down", "top" "bottom", "fore", "aft", "lateral", "longitudinal", "radial", "circumferential", etc., are used herein solely for the convenience of the reader in order to aid in the reader's understanding of the illustrated examples. The use of these directional terms does not in any manner limit the described, illustrated, and/or claimed features to a specific direction and/or orientation.

Multiple related items illustrated in the drawings with the same part number which are differentiated by a letter for separate individual instances, may be referred to generally by a distinguishable portion of the full name, and/or by the number alone. For example, if multiple "laterally extending elements" 90A, 90B, 90C, and 90D are illustrated in the drawings, the disclosure may refer to these as "laterally extending elements 90A-90D," or as "laterally extending elements 90," or by a distinguishable portion of the full name such as "elements 90".

The language used in the disclosure are presumed to have only their plain and ordinary meaning, except as explicitly defined below. The words used in the definitions included herein are to only have their plain and ordinary meaning. Such plain and ordinary meaning is inclusive of all consistent dictionary definitions from the most recently published Webster's and Random House dictionaries. As used herein, the following definitions apply to the following terms or to common variations thereof (e.g., singular/plural forms, past/present tenses, etc.):

"About" with reference to numerical values generally refers to plus or minus 10% of the stated value. For example, if the stated value is 4.375, then use of the term "about 4.375" generally means a range between 3.9375 and 4.8125.

"And/or" is inclusive here, meaning "and" as well as "or". For example, "P and/or Q" encompasses, P, Q, and P with Q; and, such "P and/or Q" may include other elements as well.

"Antenna Or Antenna System" generally refers to an electrical device, or series of devices, in any suitable configuration, that converts electric power into electromagnetic radiation. Such radiation may be either vertically, horizontally, or circularly polarized at any frequency along the electromagnetic spectrum. Antennas transmitting with circular polarity may have either right-handed or left-handed polarization. In the case of radio waves, an antenna may transmit at frequencies ranging along electromagnetic spectrum from extremely low frequency (ELF) to extremely high frequency (EHF). An antenna or antenna system designed to transmit radio waves may comprise an arrangement of metallic conductors (elements), electrically connected (often through a transmission line) to a receiver or transmitter. An oscillating current of electrons forced through the antenna by a transmitter can create an oscillating magnetic field around the antenna elements, while the charge of the electrons also creates an oscillating electric field along the elements. These time-varying fields radiate away from the antenna into space as a moving transverse electromagnetic field wave. Conversely, during reception, the oscillating electric and magnetic fields of an incoming electromagnetic wave exert force on the electrons in the antenna elements, causing them to move back and forth, creating oscillating currents in the antenna. These currents can then be detected by receivers and processed to retrieve digital or analog signals or data. Antennas can be designed to transmit and receive radio waves substantially equally in all horizontal directions (omnidirectional antennas), or preferentially in a particular direction (directional or high gain antennas). In the latter case, an antenna may also include additional elements or surfaces which may or may not have any physical electrical connection to the transmitter or receiver. For example, parasitic elements, parabolic reflectors or horns, and other such non-energized elements serve to direct the radio waves into a beam or other desired radiation pattern. Thus antennas may be configured to exhibit increased or decreased directionality or "gain" by the placement of these various surfaces or elements. High gain antennas can be configured to direct a substantially large portion of the radiated electromagnetic energy in a given direction that may be vertical horizontal or any combination thereof. Antennas may also be configured to radiate electromagnetic energy within a specific range of vertical angles (i.e. "takeoff angles) relative to the earth in order to focus electromagnetic energy toward an upper layer of the atmosphere such as the ionosphere. By directing electromagnetic energy toward the upper atmosphere at a specific angle, specific skip distances may be achieved at particular times of day by transmitting electromagnetic energy at particular frequencies. Other examples of antennas include emitters and sensors that convert electrical energy into pulses of electromagnetic energy in the visible or invisible light portion of the electromagnetic spectrum. Examples include light emitting diodes, lasers, and the like that are configured to generate electromagnetic energy at frequencies ranging along the electromagnetic spectrum from far infrared to extreme ultraviolet.

"Communication Link" generally refers to a connection between two or more communicating entities and may or may not include a communications channel between the communicating entities. The communication between the communicating entities may occur by any suitable means. For example the connection may be implemented as an actual physical link, an electrical link, an electromagnetic link, a logical link, or any other suitable linkage facilitating communication. In the case of an actual physical link, communication may occur by multiple components in the communication link configured to respond to one another by physical movement of one element in relation to another. In the case of an electrical link, the communication link may be composed of multiple electrical conductors electrically connected to form the communication link. In the case of an electromagnetic link, elements of the connection may be implemented by sending or receiving electromagnetic energy at any suitable frequency, thus allowing communications to pass as electromagnetic waves. These electromagnetic waves may or may not pass through a physical medium such as an optical fiber, or through free space, or any combination thereof. Electromagnetic waves may be passed at any suitable frequency including any frequency in the electromagnetic spectrum. In the case of a logical link, the communication links may be a conceptual linkage between the sender and recipient such as a transmission station in the receiving station. Logical link may include any combination of physical, electrical, electromagnetic, or other types of communication links.

"Computer" generally refers to any computing device configured to compute a result from any number of input values or variables. A computer may include a processor for performing calculations to process input or output. A computer may include a memory for storing values to be processed by the processor, or for storing the results of previous processing. A computer may also be configured to accept input and output from a wide array of input and output devices for receiving or sending values. Such devices include other computers, keyboards, mice, visual displays, printers, industrial equipment, and systems or machinery of all types and sizes. For example, a computer can control a network or network interface to perform various network communications upon request. The network interface may be part of the computer, or characterized as separate and remote from the computer. A computer may be a single, physical, computing device such as a desktop computer, a laptop computer, or may be composed of multiple devices of the same type such as a group of servers operating as one device in a networked cluster, or a heterogeneous combination of different computing devices operating as one computer and linked together by a communication network. The communication network connected to the computer may also be connected to a wider network such as the Internet. Thus a computer may include one or more physical processors or other computing devices or circuitry, and may also include any suitable type of memory. A computer may also be a virtual computing platform having an unknown or fluctuating number of physical processors and memories or memory devices. A computer may thus be physically located in one geographical location or physically spread across several widely scattered locations with multiple processors linked together by a communication network to operate as a single computer. The concept of "computer" and "processor" within a computer or computing device also encompasses any such processor or computing device serving to make calculations or comparisons as part of the disclosed system. Processing operations related to threshold comparisons, rules comparisons, calculations, and the like occurring in a computer may occur, for example, on separate servers, the same server with separate processors, or on a virtual computing environment having an unknown number of physical processors as described above. A computer may be optionally coupled to one or more visual displays and/or may include an integrated visual display. Likewise, displays may be of the same type, or a heterogeneous combination of different visual devices. A computer may also include one or more operator input devices such as a keyboard, mouse, touch screen, laser or infrared pointing device, or gyroscopic pointing device to name just a few representative examples. Also, besides a display, one or more other output devices may be included such as a printer, plotter, industrial manufacturing machine, 3D printer, and the like. As such, various display, input and output device arrangements are possible. Multiple computers or computing devices may be configured to communicate with one another or with other devices over wired or wireless communication links to form a network. Network communications may pass through various computers operating as network appliances such as switches, routers, firewalls or other network devices or interfaces before passing over other larger computer networks such as the Internet. Communications can also be passed over the network as wireless data transmissions carried over electromagnetic waves through transmission lines or free space. Such communications include using Wi-Fi or other Wireless Local Area Network (WLAN) or a cellular transmitter/receiver to transfer data.

"Constant speed segment" as used herein means a portion of the smooth movement speed projection that is held constant, i.e. the speed value does not change. Graphically, this is represented by a horizontal line when the Y axis of the graph represents speed and the X axis represents time or displacement.

"Control signal" as used herein means a signal applied to a controlled object from a controller. The signal may be wired or not. The signal may be electrical, electronic, optical, RF or otherwise. Examples of control signals include pulse width modulated, frequency modulated, and amplitude modulated electrical or optical signals. Control signals may optionally also contain electrical power provided to the object.

"Dynamically adjust" as used herein means to adjust something at or very near the time it is moving or changing.

"Electric motor" as used herein means an electric machine that converts electrical energy into rotating mechanical energy. Examples of electric motors include brushed DC motors, brushless DC motors, uncommutated DC motors, permanent magnet DC motors, synchronous AC motors, induction AC motors, and stepper motors.

"Envelope" as used herein means a representation of the area between two curves on a graph. One of said curves represents the minimum values and the other the maximum values. When used to define a smooth movement speed projection for an object, the envelope defines an area representing the set of target values for the speed of the object.

"Multiple" as used herein is synonymous with the term "plurality" and refers to more than one, or by extension, two or more.

"Network" or "Computer Network" generally refers to a telecommunications network that allows computers to exchange data. Computers can pass data to each other along data connections by transforming data into a collection of datagrams or packets. The connections between computers and the network may be established using either cables, optical fibers, or via electromagnetic transmissions such as for wireless network devices. Computers coupled to a network may be referred to as "nodes" or as "hosts" and may originate, broadcast, route, or accept data from the network. Nodes can include any computing device such as personal computers, phones, and servers as well as specialized computers that operate to maintain the flow of data across the network, referred to as "network devices". Two nodes can be considered "networked together" when one device is able to exchange information with another device, whether or not they have a direct connection to each other. Examples of wired network connections may include Digital Subscriber Lines (DSL), coaxial cable lines, or optical fiber lines. The wireless connections may include BLUETOOTH®, Worldwide Interoperability for Microwave Access (WiMAX), infrared channel or satellite band, or any wireless local area network (Wi-Fi) such as those implemented using the Institute of Electrical and Electronics Engineers' (IEEE) 802.11 standards (e.g. 802.11(a), 802.11(b), 802.11(g), or 802.11(n) to name a few). Wireless links may also include or use any cellular network standards used to communicate among mobile devices including 1G, 2G, 3G, 4G, or 5G. The network standards may qualify as 1G, 2G, etc. by fulfilling a specification or standards such as the specifications maintained by the International Telecommunication Union (ITU). For example, a network may be referred to as a "3G network" if it meets the criteria in the International Mobile Telecommunications-2000 (IMT-2000) specification regardless of what it may otherwise be referred to. A network may be referred to as a "4G network" if it meets the requirements of the International Mobile Telecommunications Advanced (IMTAdvanced) specification. Examples of cellular network or other wireless standards include AMPS, GSM, GPRS, UMTS, LTE, LTE Advanced, Mobile WiMAX, and WiMAX-Advanced. Cellular network standards may use various channel access methods such as FDMA, TDMA, CDMA, or SDMA. Different types of data may be transmitted via different links and standards, or the same types of data may be transmitted via different links and standards. The geographical scope of the network may vary widely. Examples include a Body Area Network (BAN), a Personal Area Network (PAN), a Local-Area Network (LAN), a Metropolitan Area Network (MAN), a Wide Area Network (WAN), or the Internet. A network may have any suitable network topology defining the number and use of the network connections. The network topology may be of any suitable form and may include point-to-point, bus, star, ring, mesh, or tree. A network may be an overlay network which is virtual and is configured as one or more layers that use or "lay on top of" other networks. A network may utilize different communication protocols or messaging techniques including layers or stacks of protocols. Examples include the Ethernet protocol, the Internet protocol suite (TCP/IP), the ATM (Asynchronous Transfer Mode) technique, the SONET (Synchronous Optical Networking) protocol, or the SDE1

(Synchronous Digital Elierarchy) protocol. The TCP/IP Internet Protocol suite may include the application layer, transport layer, Internet layer (including, e.g., IPv6), or link layer.

"Non-linear speed" as used herein means a speed that varies.

"Optionally" as used herein means discretionary; not required; possible, but not compulsory; left to personal choice.

"Predefined" as used herein means established in advance. This includes being pre-programmed and/or stored in ROM, PROM or other computer memory. This also includes components that are utilized to store values, such as voltage dividers, resistors, or other discrete components.

"Proportional integral derivative control function" as used herein means a control loop feedback mechanism that calculates an "error" value as the difference between a measured process variable (such as the speed of the seat back) and a desired setpoint value (such as the smooth motion speed profile). The function attempts to minimize the error by adjusting the process control output(s) (such as the control signal to the actuator).

"Predominately" as used herein is synonymous with greater than 50%.

"Remote" generally refers to any physical, logical, or other separation between two things. The separation may be relatively large, such as thousands or millions of miles or kilometers, or small such as nanometers or millionths of an inch. Two things "remote" from one another may also be logically or physically coupled or connected together.

"Seat" generally refers to a type of support structure or a place constructed for the purpose of allowing a human and/or other animal to sit. Some examples of seats include chairs, stools, benches, saddles, and sofas to name just a few. Typically, but not always, the seat can further include a backrest, armrest, and a headrest as well as other features.

"Sensor" as used herein means a device that senses or measures a speed parameter and records, indicates, or otherwise responds to it. Examples of sensors include, but are not limited to, a Hall Effect sensor, a potentiometer, an encoder (linear, rotary, and/or optical), an accelerometer, a tilt sensor, a rangefinder, an inclinometer, a photodiode, motion detector, or a combination of any of the previous.

"Single set of target values" as used herein means that, unlike the envelope approach, the smooth movement speed projection is represented by one curve or line or plot when graphed. This contains all of the target values for the speed of the object that the smooth movement speed projection pertains to.

"Speed parameter" as used herein means a physical attribute that can be measured to derive the speed (linear, curvilinear or rotary) of an object. Examples of speed parameters include speed, velocity, acceleration, displacement and/or position.

"Vehicle" generally refers to a machine that transports people and/or cargo. Common vehicle types can include land based vehicles, amphibious vehicles, watercraft, aircraft, and space craft. By way of non-limiting examples, land based vehicles can include wagons, carts, scooters, bicycles, motorcycles, automobiles, buses, trucks, semi-trailers, trains, trolleys, and trams. Amphibious vehicles can for example include hovercraft and duck boats, and watercraft can include ships, boats, and submarines, to name just a few examples. Common forms of aircraft include airplanes, helicopters, autogiros, and balloons, and spacecraft for instance can include rockets and rocket powered aircraft. The vehicle can have numerous types of power sources. For instance, the vehicle can be powered via human propulsion, electrically powered, powered via chemical combustion, nuclear powered, and/or solar powered. The direction, velocity, and operation of the vehicle can be human controlled, autonomously controlled, and/or semi-autonomously controlled. Examples of autonomously or semi-autonomously controlled vehicles include Automated Guided Vehicles (AGVs) and drones.

"Vehicle Braking" means in response to, directly or indirectly, applying a vehicle's foot brake to slow or stop the vehicle

What is claimed is:

1. A vehicle seating system for reducing user fatigue, comprising:
    a seat having a seat back and a seat bottom;
    a first powered seat adjustment actuator to move said seat back incline forwards and backwards between at least first seat-back position and a second seat-back position, wherein said first power seat adjustment actuator includes an electric motor; and,
    a controller for automatically controlling movement of said first powered seat adjustment actuator, wherein said controller adjusts the movement of said seat back based on a seat adjustment algorithm, the seat adjustment algorithm configured to adjust the seat-back position to reduce positional fatigue based on a combination of vehicle and occupant data, and wherein the seat adjustment algorithm comprises a control period including at least one movement period and at least one stationary period;
    wherein said vehicle and occupant data is wirelessly transferred to a remote device for creation of the seat adjustment algorithm; and,
    wherein the seat adjustment algorithm is wirelessly transferred to the controller from the remote device.

2. The system of claim 1, wherein the vehicle data includes vehicle drive status.

3. The system of claim 2, wherein the vehicle drive status includes vehicle speed, drive type, drive duration, and/or road conditions.

4. The system of claim 3, wherein the adjustment is dynamic adjustment.

5. The system of claim 3, wherein the vehicle drive status includes road conditions, and wherein said road conditions include precipitation.

6. The system of claim 1, wherein the vehicle data includes vehicle traits.

7. The system of claim 6, wherein the vehicle traits include distance from seat bottom to road surface, suspension ride type, and/or vehicle type.

8. The system of claim 1, wherein the occupant data includes occupant biometric information.

9. The system of claim 8, wherein the occupant biometric information includes weight, age, medical history, height, and/or fatigue level.

10. The system of claim 1, wherein the occupant data includes occupant position information.

11. The system of claim 10, wherein the occupant position information includes rear view mirror position, side view mirror position, brake pedal position, gas pedal position, clutch pedal position, steering wheel position, seat adjustment actuator position, occupant seat location and/or seat weight distribution.

12. The system of claim 1, wherein the occupant data includes occupant feedback information.

13. The system of claim 12, wherein the occupant feedback information includes direct feedback, and/or manual adjustment.

14. The system of claim 13, wherein direct feedback includes a user selecting a thumbs up or thumbs down on a vehicle infotainment system in response to a seat adjustment algorithm.

15. The system of claim 1, wherein the seat adjustment algorithm modifies actuation frequency, actuation magnitude, actuation movement, and/or actuation direction.

16. The system of claim 1, wherein the seat includes a seat heating and cooling system, and wherein the seat heating and cooling system is controlled by the seat adjustment algorithm.

17. The system of claim 1, wherein the controller is connected to the internet via 5G connectivity, and wherein the seat adjustment algorithm is updated through said 5G connection.

18. The system of claim 1, wherein the controller is connected to the internet at user defined locations, and wherein the seat adjustment algorithm is updated when at the user defined locations.

19. The system of claim 18, wherein the user defined location is a user's home.

20. The system of claim 19, wherein the user defined location is a user's workplace.

21. The system of claim 1, wherein the occupant selects a preset seat adjustment algorithm from a local database.

22. The system of claim 1, wherein the seat adjustment algorithm may be overridden by manually adjusting the seat.

23. The system of claim 17, wherein an override of the seat adjustment algorithm is saved to the remote device as a user seat adjustment preference.

24. The system of claim 23, wherein the user seat adjustment preferences are transferrable from vehicle-to-vehicle.

25. A vehicle seating system for reducing user fatigue, comprising:
   a seat having a seat back and a seat bottom;
   a first powered seat adjustment actuator to move said seat bottom tilt up and down between at least first seat-bottom position and a second seat-bottom position, wherein said first power seat adjustment actuator includes an electric motor; and,
   a controller for automatically controlling movement of said first powered seat adjustment actuator, wherein said controller dynamically adjusts the movement of said seat bottom based on a seat adjustment algorithm, the seat adjustment algorithm configured to adjust the seat bottom position to reduce positional fatigue based on a combination of vehicle and occupant data, and wherein the seat adjustment algorithm comprises a control period including at least one movement period and at least one stationary period;
   wherein said vehicle and occupant data is wirelessly transferred to a remote device for creation of the seat adjustment algorithm; and,
   wherein the seat adjustment algorithm is wirelessly transferred to the controller from the remote device.

* * * * *